(12) United States Patent
Jiang et al.

(10) Patent No.: US 6,421,417 B1
(45) Date of Patent: *Jul. 16, 2002

(54) MULTILAYER OPTICS WITH ADJUSTABLE WORKING WAVELENGTH

(75) Inventors: Licai Jiang, Rochester Hills; Boris Verman, Troy, both of MI (US)

(73) Assignee: Osmic, Inc., Auburn Hills, MI (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/366,028

(22) Filed: Aug. 2, 1999

(51) Int. Cl.$^7$ .................................................. G21K 1/06
(52) U.S. Cl. ............................ 378/84; 378/85; 359/846
(58) Field of Search ............................ 378/84, 85, 82, 378/145; 427/160; 359/846

(56) References Cited

U.S. PATENT DOCUMENTS

| | | |
|---|---|---|
| 4,525,853 A | 7/1985 | Keem et al. ................... 378/84 |
| 4,643,951 A | 2/1987 | Keem et al. |
| 4,675,889 A | 6/1987 | Wood et al. |
| 4,693,933 A | 9/1987 | Keem et al. |
| 4,716,083 A | 12/1987 | Eichen et al. |
| 4,717,632 A | 1/1988 | Keem et al. |
| 4,724,169 A | 2/1988 | Keem et al. |
| 4,727,000 A | 2/1988 | Ovshinsky et al. |
| 4,777,090 A | 10/1988 | Ovshinsky et al. |
| 4,783,374 A | 11/1988 | Custer et al. |
| 4,785,470 A | 11/1988 | Wood et al. |
| 4,867,785 A | 9/1989 | Keem et al. |
| 4,958,363 A | 9/1990 | Nelson et al. ................. 378/85 |
| 4,969,175 A * | 11/1990 | Nelson et al. .............. 378/146 |
| 5,022,064 A | 6/1991 | Iketaki |
| 5,027,377 A | 6/1991 | Thoe |
| 5,082,621 A | 1/1992 | Wood |
| 5,167,912 A | 12/1992 | Wood |
| 5,265,143 A * | 11/1993 | Early et al. ................... 378/84 |
| 5,384,817 A | 1/1995 | Crowther et al. |
| 5,646,976 A | 7/1997 | Gutman ........................ 378/84 |
| 5,757,882 A | 5/1998 | Gutman |
| 5,799,056 A * | 8/1998 | Gutman ........................ 378/84 |
| 5,825,844 A | 10/1998 | Miyake et al. |
| 5,923,720 A * | 7/1999 | Barton et al. ................. 378/83 |
| 6,014,423 A | 1/2000 | Gutman et al. |
| 6,038,285 A * | 3/2000 | Zhong et al. ................. 378/84 |
| 6,041,099 A | 3/2000 | Gutman et al. |
| 6,069,934 A | 5/2000 | Verman et al. |

FOREIGN PATENT DOCUMENTS

| | | |
|---|---|---|
| EP | 0 534 535 | 9/1992 |
| FR | 2658619 | 2/1990 |
| FR | 2 658 619 | 8/1991 |
| GB | 2 217 036 | 10/1989 |
| GB | 2217036 | 10/1989 |
| RU | 1 820 354 | 6/1993 |

OTHER PUBLICATIONS

Broad-band Hard X-Ray Reflectors—Joensen K.D. et al.; Neculear Instruments & Methods in Physics Research, Section-B: Beam Interactions With Materials and Atoms, NL, North-Holland Publishing Company, Amsterdam, vol. 132, No. 1, Oct. 1, 1997; pp. 221–227, XP00410091 ISSN: 0168–583X; p. 223, paragraph 2; figure 1.

K.D. Joensen et al., "Broad-band Hard X-ray Reflectors," Nuclear Instruments & Methods in Physics Research, Section –B: Beam Interactions with Materials and Atoms, vol. 132, No. 1, Oct. 1, 1977, pp. 221–227.

English language Abstract of SU 1 820 354, published by Derwent Publications of London, England, date unknown, identified as XP 002151682, located at Section PQ, Week 19942.

* cited by examiner

Primary Examiner—Drew Dunn
(74) Attorney, Agent, or Firm—Brinks Hofer Gilson & Lione

(57) ABSTRACT

An electromagnetic reflector having a multilayer structure where the electromagnetic reflector is configured to reflect multiple electromagnetic frequencies.

22 Claims, 7 Drawing Sheets

MULTILAYER OPTICS WITH ADJUSTABLE WORKING WAVELENGTH

BACKGROUND OF THE INVENTION

The present invention relates to an electromagnetic optic element. More specifically the present invention relates to reflective multilayer x-ray optics having adjustable working wavelengths.

X-ray optics are used in many applications such as x-ray diffraction analysis and spectroscopy that require the directing, focusing, collimation, or monochromatizing of x-ray energy from an x-ray source. The family of x-ray optics or reflectors used in such applications presently include: total reflection mirrors having a reflective surface coated with gold, copper, nickel, platinum, and other similar elements; crystal diffraction elements such as graphite; and multilayer structures.

The reflective surfaces in the present invention are configured as multilayer or graded-d multilayer x-ray reflective surfaces. Multilayer structures only reflect x-ray radiation when Bragg's equation is satisfied:

$$n\lambda = 2d \sin(\theta)$$

where n=the order of reflection

λ=wavelength of the incident radiation d=layer-set spacing of a Bragg structure or the lattice spacing of a crystal θ=angle of incidence Multilayer or graded-d multilayer reflectors/mirrors are optics which utilize their inherent multilayer structure to reflect narrow band or monochromatic x-ray radiation. The multilayer structure of the present invention comprises light element layers of relatively low electron density alternating with heavy element layers of relatively high electron density, both of which define the d-spacing of the multilayer. The bandwidth of the reflected x-ray radiation can be customized by manipulating the optical and multilayer parameters of the reflector. The d spacing may be changed depthwise to control the bandpass of the multilayer mirror. The d-spacing of a multilayer mirror can also be tailored through lateral grading in such a way that the Bragg condition is satisfied at every point on a curved multilayer reflector.

Curved multilayer reflectors, including parabolic, elliptical, and other aspherically shaped reflectors must satisfy Bragg's law to reflect a certain specific x-ray wavelength (also referred to as energy or frequency). Bragg's law must be satisfied at every point on a curvature for a defined contour of such a reflecting mirror. Different reflecting surfaces require different d-spacing to reflect a specific x-ray wavelength. This means the d-spacing should be matched with the curvature of a reflector to satisfy Bragg's law such that the desired x-ray wavelength will be reflected. Since Bragg's law must be satisfied, the incident angle and d-spacing are normally fixed and thus the reflected or working wavelength is fixed.

SUMMARY OF THE INVENTION

The present invention is a multilayer x-ray reflector/mirror which may be used to reflect multiple x-ray wavelengths.

In a first embodiment, the multilayer structure has a laterally graded d-spacing. The working (reflected) wavelength of the multilayer reflector may be changed by simply varying its curvature and thus the angle of incidence for an x-ray beam to satisfy Bragg's law.

In a second embodiment, an electromagnetic reflector has a fixed curvature and a multilayer structure that has been configured to include a plurality of distinct d-spacings. The multilayer structure has also been laterally graded such that the electromagnetic reflector may reflect multiple x-ray wavelengths according to Bragg's law. Thus, the lateral grading of the d-spacings have been configured in conjunction with the curvature of the multilayer coating to reflect a plurality of x-ray wavelengths.

In a third embodiment of the present invention an electromagnetic reflector is formed with stripe-like multilayer coating sections. Each of the coating sections has a fixed curvature and graded d-spacing tailored to reflect a specific wavelength. To change the working wavelength of the reflector, the mirror or x-ray source need to be moved relative to each other so that the appropriate coating section is aligned with the x-ray source.

BRIEF DESCRIPTION OF THE DRAWINGS

The various advantages of the present invention will become apparent to those skilled in the art after reading the following specification and by reference to the drawings, in which.

DETAILED DESCRIPTION OF THE PREFERRED EMBODIMENT

Figure 1:
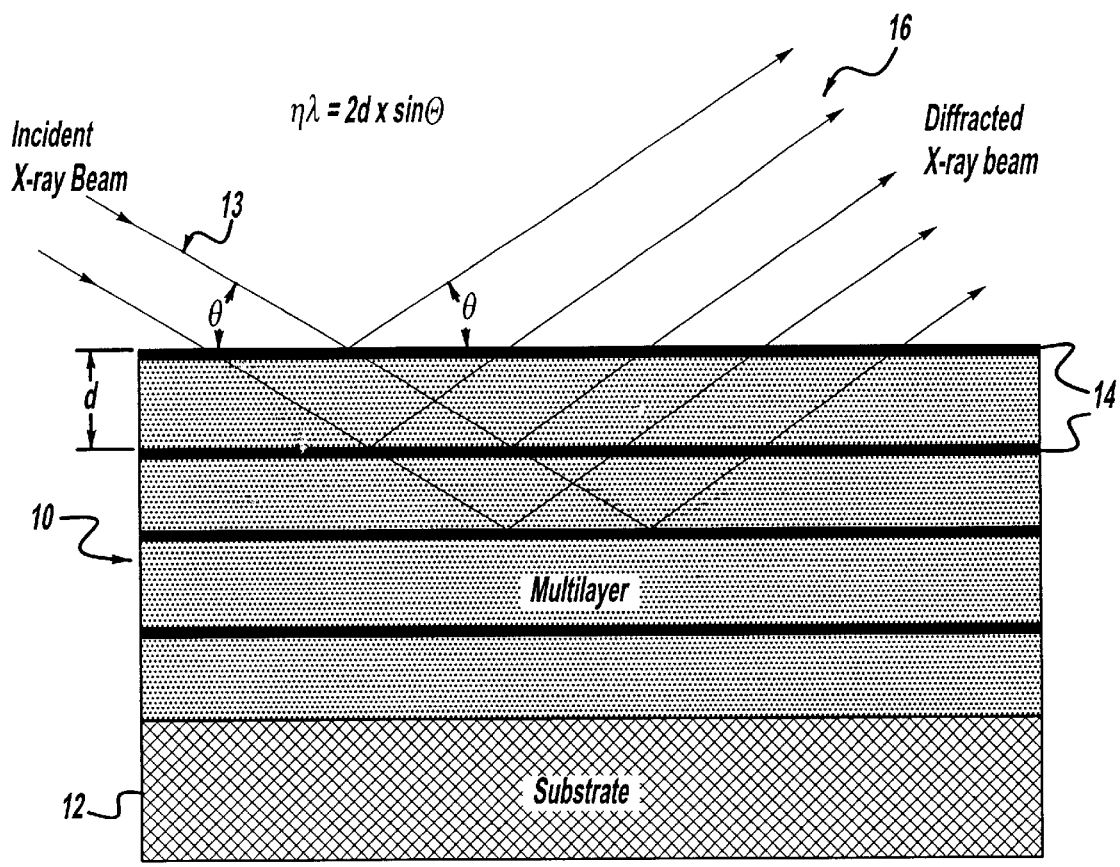
FIG. 1 is a cross-sectional diagrammatic view of a multilayer Bragg reflector.

FIG. 1 is a cross-sectional diagrammatic view of a multilayer reflector 10. The multilayer reflector 10 is deposited on a substrate 12 and comprises a plurality of layer sets with a thickness d. Each layer set 14 is made up of two separate layers of different materials; one with a relatively high electron density and one with a relatively low electron density. In operation, x-ray radiation 13 is incident on the multilayer reflector 10 and narrow band or generally monochromatic radiation 16 is reflected according to Bragg's law.

Figure 2:
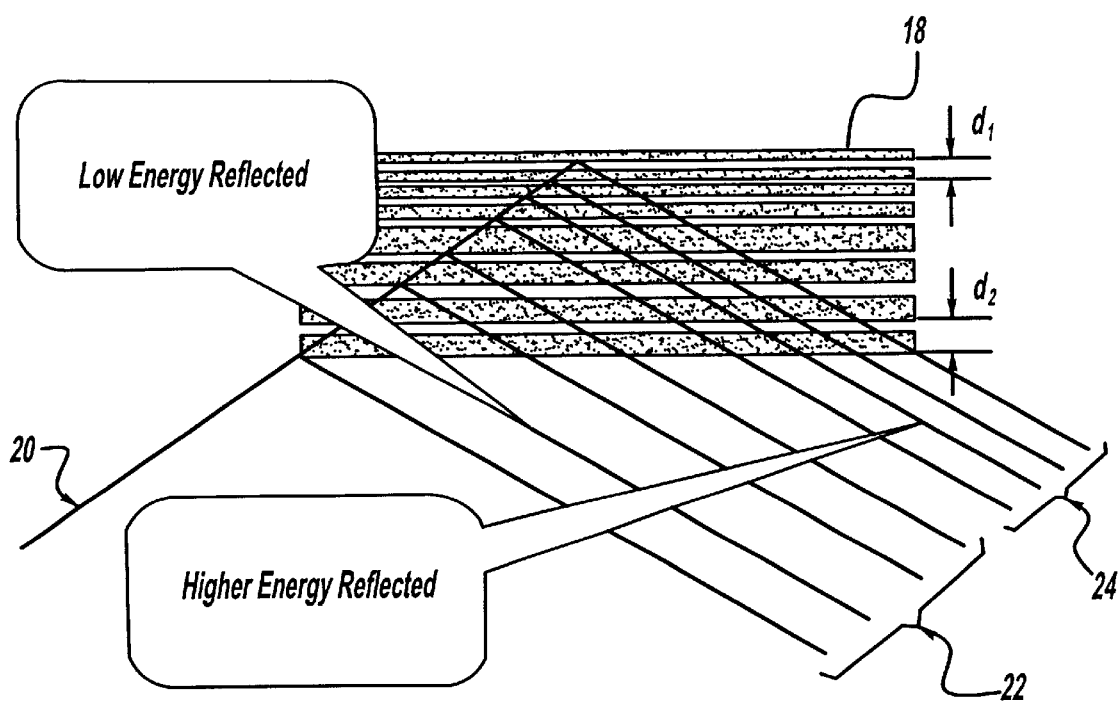
FIG. 2 is a cross-sectional diagrammatic view of a multilayer reflector with a plurality of distinct d-spacings to reflect multiple x-ray wavelengths.

FIG. 2 is a cross sectional diagram of a multilayer structure 18 having a plurality of distinct d-spacings d1 and d2 varying in the depth direction and defined as depth grading. The multilayer structure 18 because of the distinct d-spacings d1 and d2 may reflect multiple x-ray wavelengths (i.e. different groups of d-spacing to satisfy a discrete range of reflected wavelengths). In operation, polychromatic x-ray radiation 20 is incident on the surface of the multilayer structure 18 and low energy x-rays 22 are reflected by the relatively thicker d-spacings d2 and high energy x-rays 24 are reflected by the relatively thinner d-spacings d1.

Figure 3:
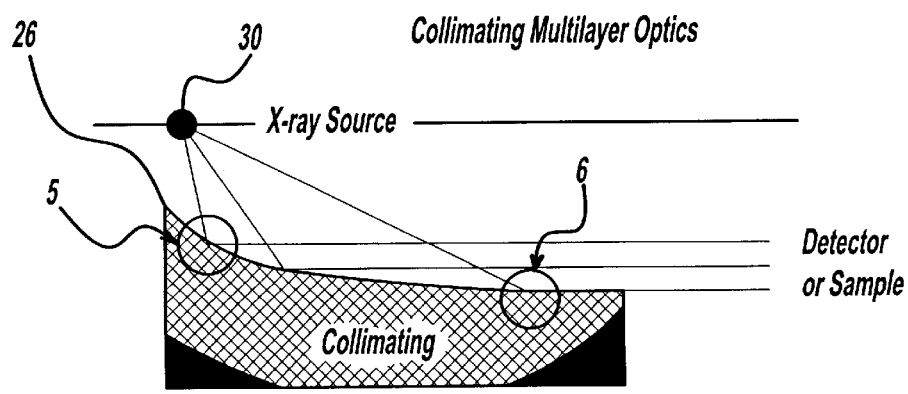
FIG. 3 is a cross-sectional view of a parabolically shaped reflector.
Figure 4:
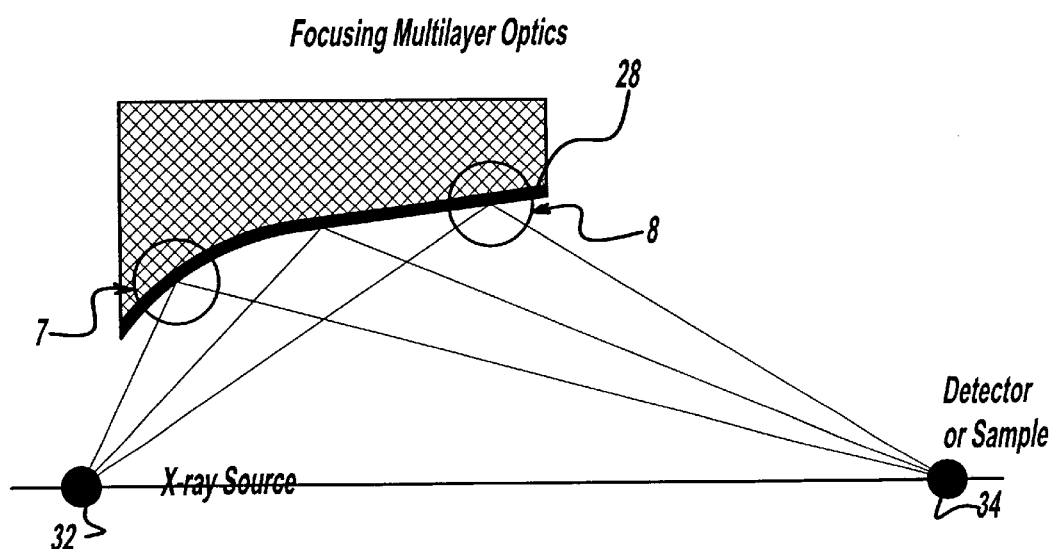
FIG. 4 is a cross-sectional view of an elliptically shaped reflector.

FIGS. 3 and 4 are cross-sectional diagrams of fixed curvature multilayer optics 26 and 28 which generally reflect only one x-ray wavelength. FIG. 3 illustrates the parabolically shaped multilayer optic 26 which collimates x-ray beams generated by an idealized point x-ray source 30 and FIG. 4 illustrates the elliptically shaped multilayer optic 28 which focuses x-ray beams generated by an x-ray source 32 to a focal point 34. The curvature and d-spacing of optics 26 and 28 have been permanently configured to satisfy Bragg's law for a specific wavelength at every point on the surface of the optics 26 and 28.

Figure 5:
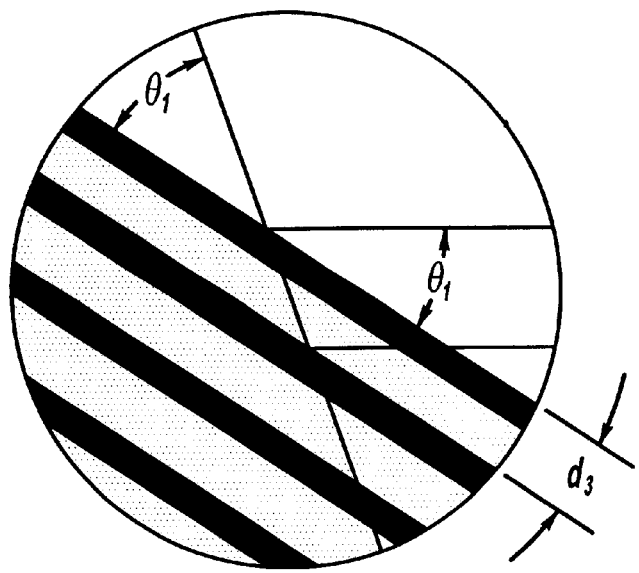
FIG. 5 is a magnified cross-sectional view taken within circle 5 of FIG. 3.
Figure 6:
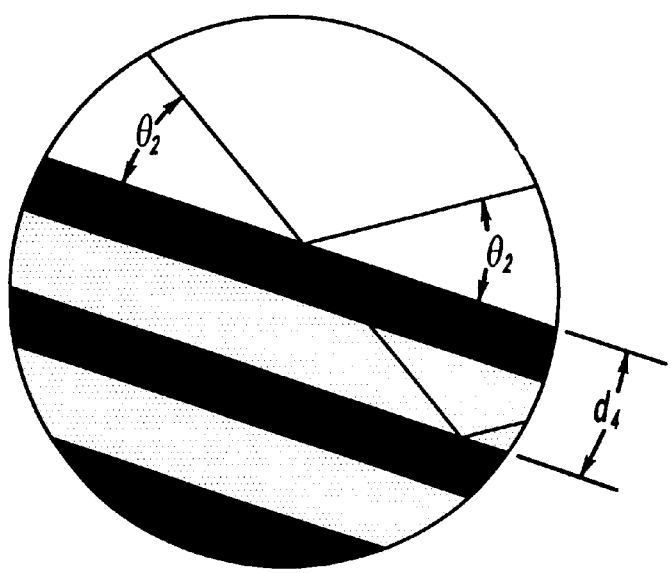
FIG. 6 is a magnified cross-sectional view taken within circle 6 of FIG. 3.
Figure 7:
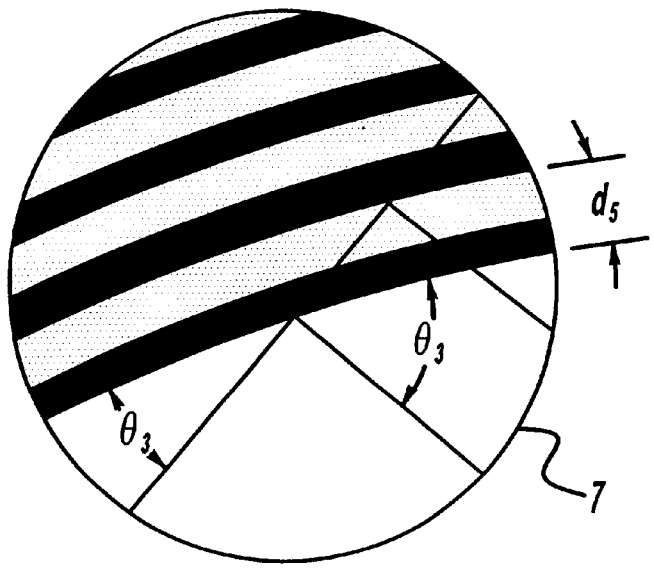
FIG. 7 is a magnified cross-sectional view taken within circle 7 of FIG. 4.

FIGS. 5, 6, 7, and 8 are cross-sectional magnified views of the multilayer surfaces taken within circles 5, 6, 7, and 8 of FIGS. 3 and 4. From these figures the variation in incident angle and the lateral grading of the d-spacing in order to satisfy Bragg's law for a specific frequency can be seen. In FIGS. 5 and 6 the parabolic optic 26 includes incident angle $\theta_1$ and d-spacing d3 at one area of its surface and incident angle $\theta_2$ and d-spacing d4 at another area. While these parameters are different, the result is that these areas reflect generally the same x-ray wavelength following Bragg's law. Similarly, in FIGS. 7 and 8 the elliptical optic 28 includes incident angle $\theta_3$ and d-spacing d5 at one area of its surface and incident angle $\theta_4$ and d-spacing d6 at another area which reflect the same x-ray wavelength. The shortcomings with these type of fixed curvature reflectors is that they may only be used to reflect a single x-ray wavelength or narrow band.

As discussed previously, multilayer reflectors require different d-spacing variations to reflect different x-ray wavelengths at the same incident angle and the d-spacing should match the surface curvature (angle of incidence) to reflect x-rays according to Bragg's law. The present invention provides electromagnetic reflectors which may be used to reflect a plurality of x-ray wavelengths having substantially no overlap.

Figure 8:
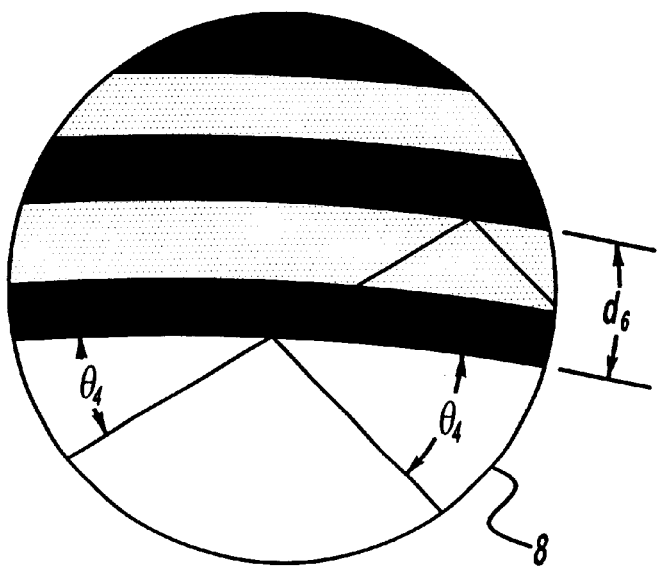
FIG. 8 is a magnified cross-sectional view taken within circle 8 of FIG. 4.

A first embodiment of the present invention shown by FIG. 8 comprises a multilayer reflector with variable curvature and a laterally graded d-spacing. If a multilayer is a flat reflector with uniform d-spacing, the flat reflector can be rotated to reflect x-rays of different wavelengths, as the incidence angle will vary. If a multilayer has a curved surface the d-spacing must be laterally graded to satisfy Bragg's law at every point. Thus, the d-spacing or incidence angle may be changed to vary the x-ray wavelength reflected from a multilayer reflector. The following discussion and equations will demonstrate that for certain x-ray wavelengths the laterally graded d-spacing of a multilayer reflector may remain constant while only the curvature is varied and the curvature of a multilayer reflector may remain constant and have multiple graded d-spacings such that multiple x-ray wavelengths may be reflected by the multilayer reflector.

For parabolic, elliptical, and other aspherically shaped multilayer optics, either the d-spacing variation of the multilayer coating or the curvature of the optics can be manipulated such that the multilayer optics reflect x-rays with different wavelengths. Following Bragg's law the d-spacing is given by:

$$d = \frac{\lambda}{2\sin\theta} \quad (1)$$

Where $\theta$ is the incident angle. It can be shown that the sin $\theta$ can be written, at a very accurate approximation, as a product of a factor "C" (an arbitrary constant) and common form which is independent from the x-ray energy. The same d-spacing can be used for different wavelengths by changing the factor C such that $\lambda/C$ is a constant. Accordingly, sin $\theta$, which is determined by the configuration of the reflection surface, can be maintained the same if d-spacing is proportionally changed with the wavelength such that:

$$\sin\theta = \frac{\lambda}{2d} \quad (1b)$$

is maintained constant for different wavelengths.

For a parabolic mirror the curvature of the reflecting surface can be written as:

$$y = \sqrt{2px} \quad (2)$$

where p is the parabolic parameter. The accurate incident angle can be given by the following formula:

$$\theta = \tan^{-1}\left(\frac{\sqrt{2px}}{x - \frac{p}{2}}\right) - \tan^{-1}\left(\sqrt{\frac{p}{2x}}\right)$$

p generally is a number on the order of 0.1 and x is generally in the range of several tens of millimeters to more than 100 millimeters. Due to the fact that $\theta$ is small where $\tan\theta \approx \theta$, the incident angle can be written as:

$$\theta = \sqrt{p}\,\frac{1}{\sqrt{2x}} \quad (3)$$

Using small angle approximation, d-spacing is determined by:

$$d = \frac{\lambda}{\sqrt{p}}\sqrt{\frac{x}{2}} \quad (4)$$

From the equations shown above it can be shown that d-spacing can be maintained for different reflected wavelengths by altering the curvature or parabolic parameter (p) of a parabolic shaped multilayer reflector.

For an elliptical mirror, the reflection surface is described by the equation:

$$\frac{x^2}{a^2} + \frac{y^2}{b^2} = 1 \quad (5)$$

Where x and y are points in a Cartesian coordinate system and a is the major radius of the ellipse and b is the minor radius of the ellipse. The incident angle is given by the equation:

$$\theta = \tan^{-1}\left(\frac{\frac{b}{a}\sqrt{a^2-x^2}}{x+c}\right) - \tan^{-1}\left(\frac{-2bx}{a\sqrt{a^2-x^2}}\right)$$

where c is defined by the equation:

$$c=\sqrt{a^2-b^2}$$

For an x-ray elliptical mirror, the minor radius is much smaller than the major radius. Using small angle approximation, the above equation can be written as:

$$\theta \approx \frac{q\sqrt{a^2-x^2}}{x+a\sqrt{1-q^2}} - \frac{-2qx}{\sqrt{a^2-x^2}}$$

where q=b/a. Therefore the d-spacing is given by the equation:

$$d = \frac{\lambda}{q}\frac{1}{2\left(\frac{\sqrt{a^2-x^2}}{x+a} + \frac{2x}{\sqrt{a^2-x^2}}\right)} \quad (6)$$

From the above formula, it can be shown that the d-spacing and focal position can be maintained by just changing the minor radius b.

Furthermore, we determine how d-spacing is defined as well as the wavelength dependency on d-spacing for a multilayer reflector. The d-spacing used in this application is defined by using first order Bragg's law (n=1), since multilayers generally operate under first order reflection. The "real d-spacing", or the "geometric d-spacing is different from the "first order Bragg d-spacing" due to the effects of refraction in the multilayer structure. In most applications a multilayer optic is used as a first order Bragg reflector. This is the reason that "d-spacing" is commonly defined and measured by the first order Bragg's law. Such defined d-spacing is the same for different wavelengths as shown in the following discussion.

The "real d-spacing" $d_r$ is given by the following equation:

$$d_r = d\left(1 - \frac{\delta}{\sin^2\theta}\right) \quad (7)$$

where δ is the optical index decrement. Therefore, higher order measurement gives a d-spacing closer to the "real d-spacing". However, the optical index is proportional to the square of the wavelength and so is $\sin^2\theta$. Therefore, the above equation becomes:

$$d' = d(1-Ad^2) \quad (8)$$

where A is a constant not dependent on energy. This means that the "first order d-spacing" is the same for different wavelengths and the d-spacing measured by different wavelengths is the same.

Figure 9:
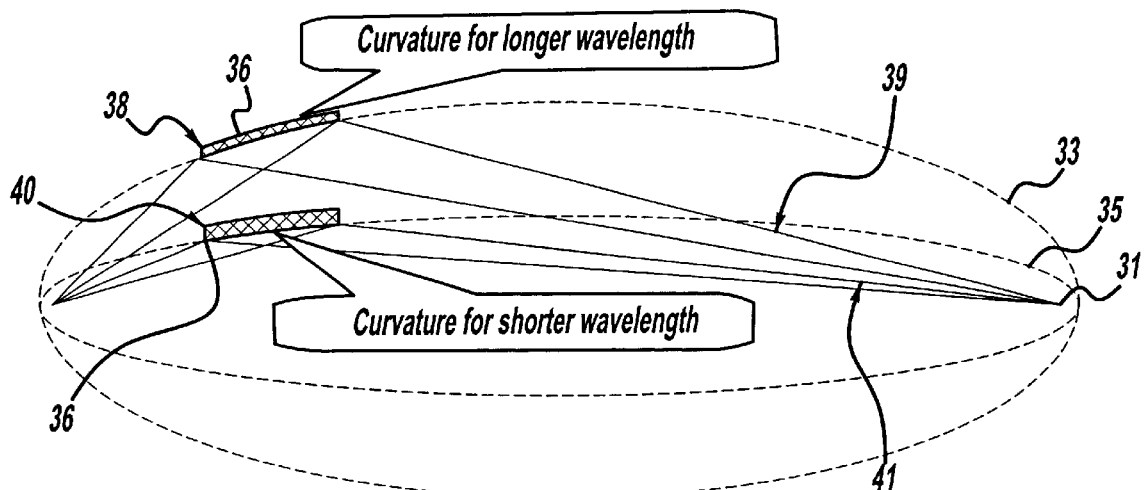
FIG. 9 is a diagrammatic view of the first embodiment of the reflector of the present invention illustrating its variable curvature and ability to reflect different x-ray wavelengths.

Referring to FIG. 9 and the first embodiment of the present invention, a variable curvature multilayer reflector 36, is shown in two positions 38 and 40 having two different curvatures defined by the ellipses 33 and 35 and reflecting different x-ray wavelengths 39 and 41 to a focal point 31. A similar scheme may be configured for parabolic collimating mirrors which conform to two different parabolas. The reflector 36 has more curvature at position 38 then at position 40. The increased curvature will allow the reflector to reflect larger x-ray wavelengths at position 38 then at position 40. The reflector at position 40 is modified with less curvature then at position 38 and will reflect shorter x-ray wavelengths. The curvature of the reflector 36 is exaggerated in FIG. 9 to help illustrate the curvature at the alternate positions 38 and 40.

For a variable curvature parabolic mirror from Formula 4:

$$\frac{\lambda}{\sqrt{p}} = C$$

for all the wavelengths. Therefore the parabolic parameter must change in the following way:

$$p = \frac{\lambda^2}{C^2} \quad (9)$$

For an elliptical mirror, according to formula 6, the minor radius b must change as:

$$b = \frac{\lambda a}{C} \quad (10)$$

Thus, the manipulation of the parabolic parameter ρ of the parabolic reflector and the minor radius b of the elliptical reflector may be adjusted to vary the wavelength of the reflected x-rays.

Figure 10:
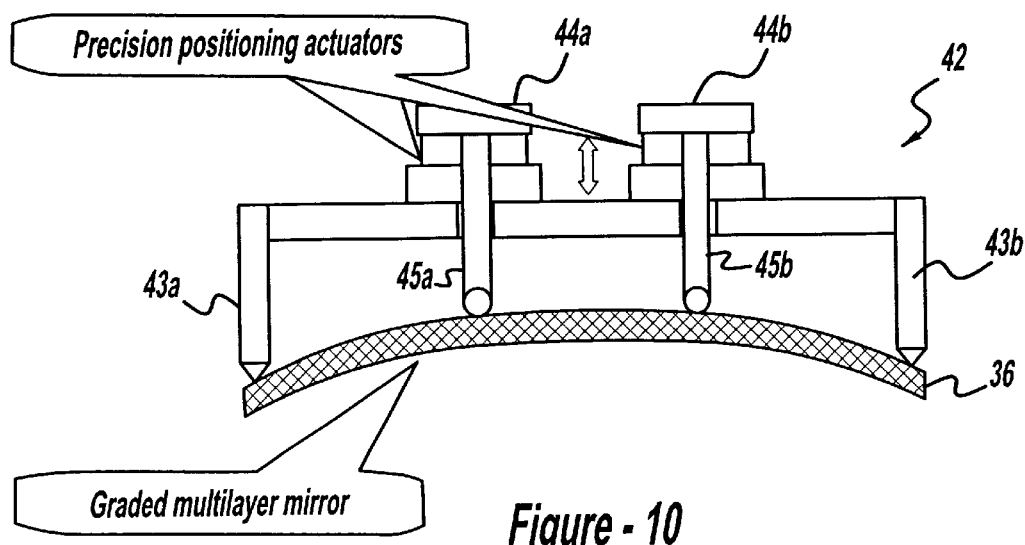
FIG. 10 is a diagrammatic view of a bender used in the present invention.

A four point bender 42 is shown in FIG. 10 having precision actuators 44a and 44b which will vary the curvature of the reflector 36. Posts 43 are fixed while members 45 are actuated to alter the curvature of the reflector 36. The bender 42 will vary the parabolic parameter ρ of a parabolically shaped multilayer reflector and the minor radius b of an elliptically shaped multilayer reflector as detailed above.

Figure 11:
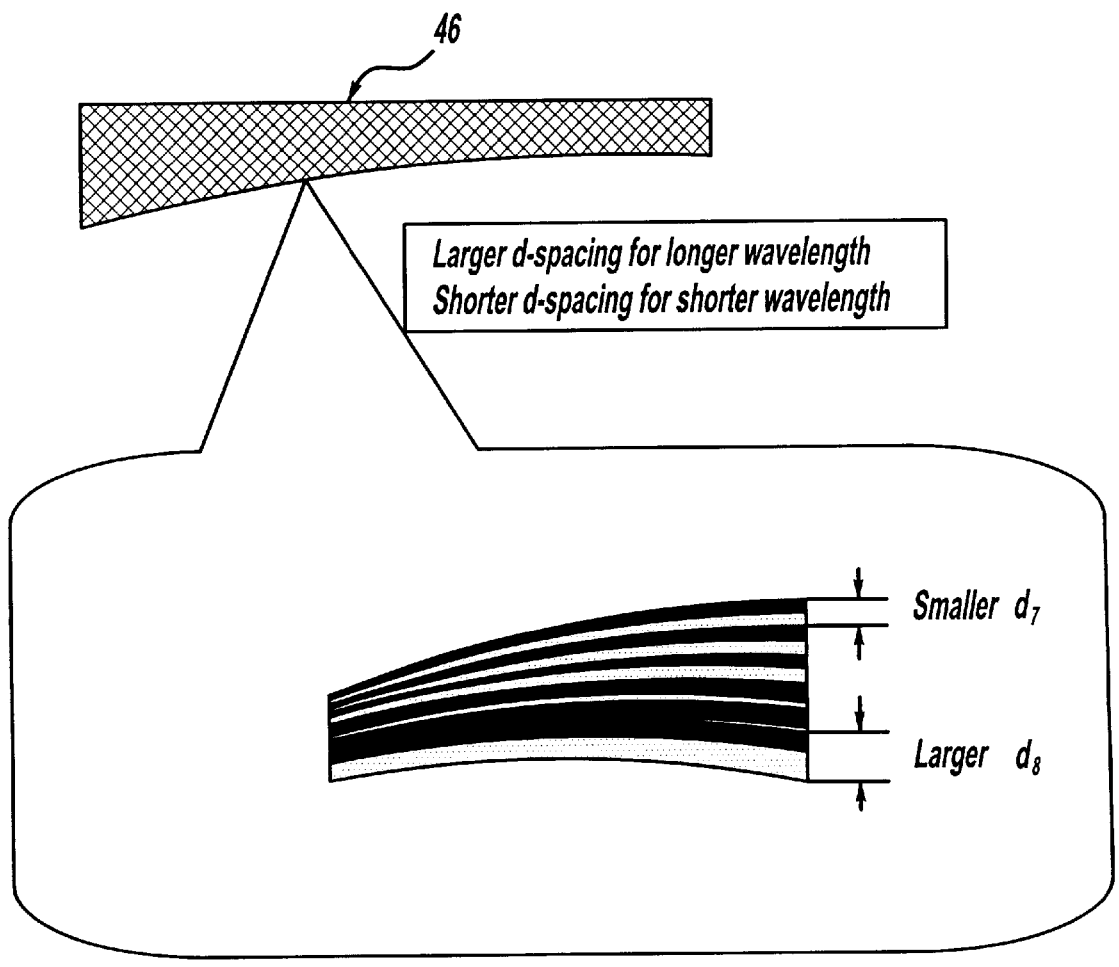
FIG. 11 is a cross sectional view of the second embodiment of the reflector of the present invention having a fixed curvature that is configured to include a plurality of distinct d-spacings and laterally graded such that it may reflect multiple x-ray wavelengths.

In a second embodiment of the present invention shown in FIG. 11, a multilayer reflector 46 of fixed curvature, with a plurality of distinct d-spacings d7 and d8, is configured to reflect multiple x-ray wavelengths. Each d-spacing d7 and d8 will satisfy Bragg's law for a specific x-ray wavelength. The relatively larger d-spacing d8 will reflect longer wavelengths and the relatively shorter d-spacing d7 will reflect shorter wavelengths. The reflected wavelengths will have substantially no overlap. Since the absorption for lower energy (longer wavelength) x-rays is stronger, the reflection layer d8 for the lower energy x-rays should be the top layers on the reflector 46. As can be seen in the drawing, the d-spacings d7 and d8 are laterally graded in cooperation with the curvature of the reflector 46 to satisfy Bragg's law for a plurality of specific x-ray wavelengths. In alternate embodiments of the present invention additional groups of d-spacings may be used limited only by the dimensions and structure of the reflector 46.

Figure 12:
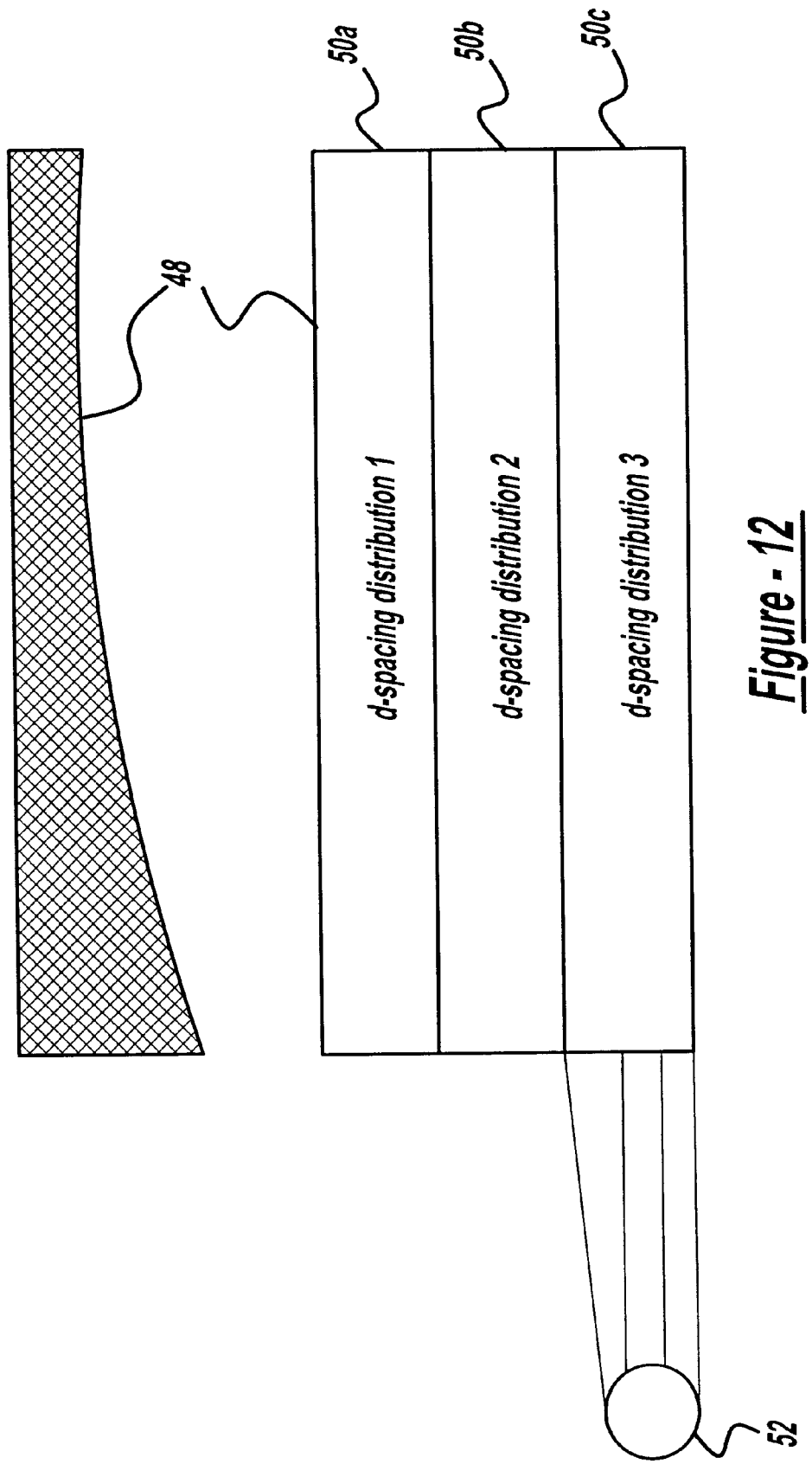
FIG. 12 is a top view of the third embodiment of the reflector of the present invention with stripe-like sections having different d-spacings such that the reflector can reflect a plurality of x-ray frequencies.

In a third embodiment of the present invention seen in FIG. 12 (an overhead or top view) a multilayer reflector 48 having stripe like sections 50 with different d-spacings is shown. Each stripe 50 has a d-spacing configured to reflect specific x-ray wavelengths. An x-ray source 52 needs only to be translated relative to the stripe like sections 50 of the reflector 48 to change the wavelength of the x-rays reflected from the reflector 48. The preferred method of translation is to fix the position of the x-ray source 52 while translating the reflector 48.

It is to be understood that the invention is not limited to the exact construction illustrated and described above, but that various changes and modifications may be made without departing from the spirit and scope of the invention as defined in the following claims.

We claim:

1. An electromagnetic reflector comprising:

a multilayer structure having a d-spacing and a first curvature to reflect a first electromagnetic frequency, and a movement apparatus that varies said first curvature of said multilayer structure to a second curvature so that said multilayer structure reflects a second electromagnetic frequency.

2. The electromagnetic reflector of claim 1, wherein said multilayer structure is deposited on a substrate.

3. The electromagnetic reflector of claim 1, wherein said d-spacing is laterally graded.

4. The electromagnetic reflector of claim 1, wherein said first electromagnetic frequency and said second electromagnetic frequency are each x-ray frequencies.

5. The electromagnetic reflector of claim 1, wherein said movement apparatus is a bender which alters the curvature of said multilayer structure.

6. The electromagnetic reflector of claim 5, wherein said bender is a four point bender.

7. The electromagnetic reflector of claim 1, wherein said electromagnetic reflector is shaped as a parabolic curve and said parabolic curve has a p factor that is varied to change a curvature of said electromagnetic reflector.

8. The electromagnetic reflector of claim 1, wherein said electromagnetic reflector is shaped as an elliptical curve and said elliptical curve has a minor radius that is varied to change a curvature of said electromagnetic reflector.

9. A method of reflecting multiple electromagnetic frequencies with a multilayer reflector comprising:

generating electromagnetic energy;

directing said electromagnetic energy at said multilayer reflector; and during said directing, adjusting a curvature of said multilayer reflector to reflect said electromagnetic energy in accordance with Bragg's law.

10. The method of claim 9, wherein said electromagnetic energy comprises x-rays.

11. An electromagnetic optic comprising:

a multilayer surface, said multilayer surface comprising a curvature that varies from a first curvature that reflects a first wavelength of electromagnetic energy to a second curvature that reflects a second wavelength.

12. The electromagnetic optic of claim 11, wherein said multilayer surface is laterally graded.

13. The electromagnetic optic of claim 11, wherein said first electromagnetic frequency and said second electromagnetic frequency are each x-ray frequencies.

14. The electromagnetic optic of claim 11 further comprising a bender to alter the curvature of said multilayer surface.

15. An x-ray reflector comprising:

a first multilayer section, wherein said first multilayer section has a d-spacing as measured along a first direction and configured to reflect a first x-ray frequency; and a second multilayer section arranged side by side with said first multilayer section along a second direction, wherein said second multilayer section has a d-spacing as measured along said first direction and configured to reflect a second x-ray frequency.

16. The x-ray reflector of claim 15, wherein said first and second multilayer sections are each configured with an elliptical surface.

17. The x-ray reflector of claim 15, wherein said first and second multilayer sections are each configured with a parabolic surface.

18. An electromagnetic energy system comprising:

an electromagnetic energy source that directs electromagnetic energy at an electromagnetic reflector;

said electromagnetic reflector comprising:

a multilayer structure having a d-spacing and a first curvature to reflect a first electromagnetic frequency; and a movement apparatus that varies said first curvature of said multilayer structure to a second curvature so that said multilayer structure reflects a second electromagnetic frequency.

19. The electromagnetic energy system of claim 18, wherein said electromagnetic energy source directs x-rays at said electromagnetic reflector.

20. An electromagnetic energy system comprising:

an electromagnetic energy source that directs electromagnetic energy at an electromagnetic optic;

said electromagnetic optic comprising:

a multilayer surface, said multilayer surface comprising a curvature that varies from a first curvature that reflects a first wavelength of electromagnetic energy to a second curvature that reflects a second wavelength.

21. The electromagnetic energy system of claim 20, wherein said electromagnetic energy source directs x-rays at said electromagnetic optic.

22. An x-ray system comprising:

an x-ray source that directs x-rays at an x-ray reflector;

said x-ray reflector comprising a first multilayer section, wherein said first multilayer section has a d-spacing as measured along a first direction and configured to reflect a first x-ray frequency; and a second multilayer section arranged side by side with said first multilayer section along a second direction, wherein said second multilayer section has a d-spacing as measured along said first direction and configured to reflect a second x-ray frequency.

* * * * *

UNITED STATES PATENT AND TRADEMARK OFFICE
CERTIFICATE OF CORRECTION

PATENT NO. : 6,421,417 B1
DATED : July 16, 2002
INVENTOR(S) : Licai Jiang et al.

It is certified that error appears in the above-identified patent and that said Letters Patent is hereby corrected as shown below:

Title page,
Item [56], FOREIGN PATENT DOCUMENTS, delete "9/1992" and substitute -- 3/1993 -- in its place.

Column 7,
Line 8, immediately after "frequency" delete "," (comma) and substitute -- ; -- (semicolon) in its place.

Signed and Sealed this

Twentieth Day of May, 2003

JAMES E. ROGAN
*Director of the United States Patent and Trademark Office*